(12) United States Patent
Anthony et al.

(10) Patent No.: US 11,338,367 B2
(45) Date of Patent: May 24, 2022

(54) METAL POWDER COMPACTORS

(71) Applicant: HEWLETT-PACKARD DEVELOPMENT COMPANY, L.P., Spring, TX (US)

(72) Inventors: Thomas Anthony, Palo Alto, CA (US); Seongsik Chang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,260

(22) PCT Filed: Jun. 8, 2018

(86) PCT No.: PCT/US2018/036607
§ 371 (c)(1),
(2) Date: Oct. 18, 2019

(87) PCT Pub. No.: WO2019/236099
PCT Pub. Date: Dec. 12, 2019

(65) Prior Publication Data
US 2021/0354202 A1    Nov. 18, 2021

(51) Int. Cl.
*B33Y 10/00* (2015.01)
*B33Y 30/00* (2015.01)
*B33Y 40/00* (2020.01)
*B22F 12/00* (2021.01)
*B22F 10/50* (2021.01)

(52) U.S. Cl.
CPC .............. *B22F 10/50* (2021.01); *B22F 12/00* (2021.01); *B33Y 10/00* (2014.12); *B33Y 30/00* (2014.12); *B33Y 40/00* (2014.12)

(58) Field of Classification Search
CPC .......... B22F 10/50; B22F 12/00; B33Y 10/00; B33Y 30/00; B33Y 40/00
See application file for complete search history.

(56) References Cited

U.S. PATENT DOCUMENTS

| 7,384,661 | B2 | 6/2008 | Feather et al. |
| 9,643,251 | B2 | 5/2017 | Zalewski |
| 10,035,219 | B2* | 7/2018 | Coward ................. B33Y 40/00 |
| 10,272,618 | B2* | 4/2019 | Hays ...................... B29C 64/194 |
| 10,647,104 | B2* | 5/2020 | Kobayashi .............. B22F 12/00 |
| 2005/0281702 | A1 | 12/2005 | Clark et al. |
| 2010/0180725 | A1* | 7/2010 | Goto ....................... C23C 26/00 |
| | | | 75/236 |
| 2016/0059307 | A1 | 3/2016 | Rosinski |
| 2016/0243764 | A1* | 8/2016 | Hays ..................... B29C 64/141 |
| 2016/0368056 | A1 | 12/2016 | Swaminathan et al. |

(Continued)

FOREIGN PATENT DOCUMENTS

| RU | 2103113 C1 | 1/1998 |
| WO | WO2009108913 A3 | 11/2009 |

*Primary Examiner* — Lawrence Averick
(74) *Attorney, Agent, or Firm* — Fabian VanCott

(57) ABSTRACT

A system for compacting layers of metal powder, including: a layer of metal powder at a first voltage; and a conductive object above the layer of metal powder, the conductive object at a second voltage, wherein a voltage differential between the layer of metal powder and the conductive object is sufficient to attract particles from the layer of metal powder to the conductive object, change the voltage on the particles, and redeposit the particles in the layer of metal powder.

16 Claims, 5 Drawing Sheets

(56) References Cited

U.S. PATENT DOCUMENTS

2017/0198394 A1\* 7/2017 Coward .............. B23K 26/144
2017/0246709 A1    8/2017 Guerrier et al.
2017/0274602 A1\* 9/2017 Kobayashi ........... B29C 64/209

\* cited by examiner

METAL POWDER COMPACTORS

BACKGROUND

Three dimensional printing has seen increasing use as a method of manufacturing parts. Historically, metal parts, generally machined and/or cast, were used for components in mechanically demanding applications. Machining tended to be the most expensive due to the cost of a skilled machinist. However, machining was also highly flexible and capable of tight tolerances that were difficult to achieve by other methods. The development of automated and semi-automated machining techniques has reduced the touch time (the time a machinist was operating a system) and the cost of machining parts. Swiss machines (historically) and Computer Numerical Control (CNC) systems have seen increasing adoption as they have been able to automate increasingly complex machining tasks, with a reduction in per part machinist time. However, other technologies have emerged that also have threatened the supremacy of machined metal parts.

Three dimensional printing has been able to produce figures using polymers. These figures often lack mechanical strength compared with metal parts. In some cases, patterns have been produced using three dimensional printing and then used to cast metal parts, for example, using a lost wax type process. This has sometimes been more cost effective than machining parts but overall the increased number of operations and different technologies (printing and casting) used have slowed adoption of this approach.

Powder metallurgy molding has been used to manufacture metal parts for some applications, although various technical challenges have prevented more widespread adoption. However, the principles of powder metallurgy molding have produced advancement of knowledge in the field of powder metallurgy, which has been useful in the area of three-dimensional printing of metal parts from powders.

BRIEF DESCRIPTION OF THE DRAWINGS

The accompanying drawings illustrate various examples of the principles described herein and are a part of the specification. The illustrated examples do not limit the scope of the claims.

Figure 1:
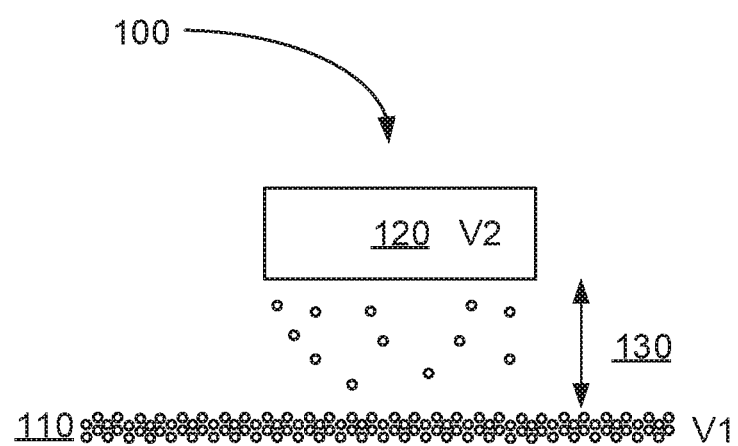
FIG. 1 shows an example of a system for compacting powder layers according to one example consistent with this specification.

Throughout the drawings, identical reference numbers designate similar, but not necessarily identical, elements. The figures are not necessarily to scale, and the size of some parts may be exaggerated or minimized to more clearly illustrate the example shown. The drawings provide examples and/or implementations consistent with the description. However, the description is not limited to the examples and/or implementations shown in the drawings.

DETAILED DESCRIPTION

A common feature of metal powders distributed in a layer-wise manner is low packing density. As the powder is distributed in preparation for further processing, the powder may not form particularly tight compaction. Accordingly, density of the powder layer may be in the neighborhood of 40% to 50% of the density of the solid material. Interstitial space in the powder layer may have some negative impacts on the formed parts. In the selective laser melting process, low powder layer density can lead to entrapped powder or porosity. In the binder jet process, low powder layer density can yield reduced green part densities, which in turn are associated with reduced green part strength and longer, higher temperature sintering profiles. Lower green part densities also are associated with increased shrinkage and/or deformation during sintering and/or densification operations. Retention of porosity in the final sintered object results in reduced strength and poor fatigue resistance.

Some systems have used mechanical compaction of powder layers during distribution, for example, providing a roller or plate to press the powder layer down. This can increase density of the powder layer but may also disturb and/or move the powder layer.

Increasing the density of the metal powder used to form a printed object may increase the strength of the object, reduce shrinkage and/or deformation, reduce cycle time for densification, and/or have other benefits. This specification describes a method of compacting layers of metal powders by moving particles between the layer and a conductive object under the influence of a voltage differential such that the moving particles compact the layer of metal powder.

Among other examples, this specification describes a system for compacting layers of metal powder, including: a layer of metal powder at a first voltage; and a conductive object above the layer of metal powder, the conductive object at a second voltage, wherein the conductive object and layer of metal powder are separated by a gap and a voltage differential between the layer of metal powder and the conductive object is sufficient to reposition particles to new locations within the layer of metal powder layer.

This specification also describes a system including: a layer of powder comprising metal particles, the layer of powder having a surface at a first voltage; a conductive object having a second voltage, the conductive object and the layer of powder separated by a gap; an actuator to provide relative lateral motion between the conductive object and the layer of metal powder; and a power supply to provide the first voltage to the layer of powder and the second voltage to the conductive object, wherein a voltage difference between the layer of powder and the conductive object induces charged metal particles of the powder layer to move from the layer to the conductive object, assume the voltage of the conductive object, and move from the conductive object to the layer.

This specification also describes a method to increase density of a layer of metal powder, including: applying a first voltage to the layer of metal powder; and applying a second voltage to a conductive object located above the layer of metal powder such that particles of the metal powder acquire charge and move under the influence of a voltage difference between the layer of metal powder and the conductive object.

Turning now to the figures, FIG. 1 shows a system (100) for compacting layers of metal powder, including: a layer of metal powder (110) at a first voltage; and a conductive object (120) above the layer of metal powder, the conductive object at a second voltage, wherein the conductive object (120) and layer of metal powder (110) are separated by a gap (130) and a voltage differential between the layer of metal powder (110) and the conductive object (120) is sufficient to reposition particles to new locations within the layer of metal powder layer.

The system (100) is a system (100) for compacting powder. The system (100) uses a voltage difference to extract particles from the powder and redeposit the particles. The amount of compaction depends on the voltage difference between the surface of the powder layer and the conductive object, the mass of the particles, and the separation between the surface of the powder layer and the conductive object. The system may be used to selectively extract and redeposit the smaller conductive particles in the layer. The system (100) may be used to provide vibration to the particles in the layer. The system (100) may be limited to the top of the layer of particles. The system (100) may extract and then redeposit particles originating below the uppermost layer of particle, producing mixing and compaction of multiple layers.

The layer of metal powder (110) includes metal particles. The layer of metal powder may include some amount of non-conductive particles and still receive the desired compaction from the conductive particles. Some examples of non-conductive particles may include polymers, metal oxides, ceramics, silicas, silicates, etc. The layer of metal powder (110) may include a substantially flat upper surface. Being composed of particles, a layer of metal powder cannot be truly "flat." However, it may be useful to control the separation between the topmost particles in the layer of metal powder (110) and the conductive object (120). The separation and the voltage difference drive the attraction between the conductive object (120) and the particles of the layer of metal powder (110). Accordingly, a flat upper surface on the layer of metal powder (110) may reduce variation in the attractive force over the layer of metal powder (110).

The layer of metal powder (110) may be formed using techniques used in forming layers of metal powder (110) in the production of metal three-dimensional printed parts. A roller may be used to form the layer of metal powder (110). A pusher, blade, and/or other device or tool may be used to form the layer of metal powder. The system may include a mechanical shaker and/or tapper to vibrate the powder in the layer of metal powder (110).

The layer of metal powder (110) is at first voltage. Specifically, conductive particles at the surface of the layer of metal powder are at the first voltage. The first voltage can be realized by establishing electrical connection between the powder bed and a power supply or electrical ground.

The conductive object (120) is brought into proximity to the layer of metal powder (110). The conductive object (120) has a surface at a second voltage. The second voltage can be realized by establishing electrical connection between the conductive object (120) and a power supply. Metal particles that traverse the air gap (130) and contact the conductive object will acquire the voltage of the conductive object (120) and the sign of the charge will be reversed. The conductive object (120) may have a flat surface facing the layer of metal powder (110). In an example, the voltage applied is insufficient to extract particles from the layer of metal powder (110) but is sufficient to vibrate and/or compact the particles.

The attraction to the conductive object (120) may provide energy to allow the particles to find a lower energy configuration in the layer of metal powder (110).

In an example, the conductive object (120) covers a full width of the layer of metal powder (110). The conductive object (120) may cover a full width and full length of the layer of metal powder (110). Such a design may allow compacting of the entire layer simultaneously. The conductive object (120) may move relative to the layer of metal powder (110). In an example, the conductive object (110) rasters above the layer of metal powder (110). The conductive object (110) may move parallel to a surface of the layer of metal powder (110). The conductive object may move laterally above the layer of metal powder (110).

The conductive object (120) may have a flat lower surface facing the layer of metal powder (110). The conductive object (120) may have a tapered leading edge, where the leading edge is a direction of motion of the conductive object (120) relative to the layer of metal powder (110). The leading edge may have a greater separation from the layer of metal (110) powder than the body of the conductive object (120). The conductive object (120) may have a tapered trailing edge. The increased separation may produce a gradual ramp-up and ramp-down of the attractive force between the layer of metal powder (110) and the conductive object (120) as the conductive object (120) moves laterally above the layer of metal powder (110). The system (100) may include an actuator and/or group of actuators to move the conductive object (120) relative to the layer of metal powder (110). The actuator(s) may provide motion in X, Y, Z, and/or other directions.

The conductive object (120) is at a second voltage. A voltage difference exists between the surface of the layer of metal powder (110) and the conductive object (120). The voltage difference provides an attractive force between the particles of the layer of metal powder (110) and the conductive object (120).

If the attractive force exceeds gravitational and localized stiction forces, the attractive force will overcome the weight of charged particles in the layer of metal powder (110). The charged particles move toward the conductive object (120). Upon contacting the conductive object (120) the charged particles acquire the voltage of the conductive object (120) and the sign of the charged particles is reversed to match the sign of charge on conductive object (120). The charged particles are then attracted to the layer of metal powder (110). The charged metal particles then impact the layer of metal powder (110). The impacts of the metal particles on the layer of metal powder compacts the powder and provides energy to rearrange the metal powder.

The electrostatic force acting on a powder particle residing on the surface of powder layer (110) is equal to the charge on the particle times the electric field present in the gap (130) between the powder layer (110) and the conductive object (120). The charge on the particle is proportional to the electric field in the gap (130), which is equal to the voltage difference between the layer of powder (110) and the conductive object (120) divided by the gap (130). As a result, the electrostatic force acting on a powder particle is proportional to the square of the voltage difference between the powder layer and conductive object divided by the square of the gap (130). For a given gap (130), the voltage difference between the powder layer and conductive object is the primary variable determining which particles from the layer of metal powder (110) are displaced. As the voltage difference is increased, loosely held particles and smaller particles are preferentially displaced. As the voltage difference is increased, the current flowing between the surface and the conductive object increases. This current indicates the charge being transferred by the metal particles. The current may be a function of the number particles moving between the layer of metal particles (110) and the charged object (120), the charge per particle, and/or the speed of the particle.

In an example, the voltage difference between the layer of powder (110) and the conductive object (120) is between 100 V and 8000 V. The voltage difference may be 500 V to 2000 V. The voltage difference may be 200 V to 5000 V. The voltage difference may be a DC voltage. The voltage difference by be a DC voltage with an AC voltage applied on top of the DC voltage. The voltage difference may be an AC voltage.

In an example, the layer of metal powder (110) and the conductive object (120) are separated by 0.2 to 5 mm of gap (130). The gap (130) may be 0.2 mm to 1 mm in height. The gap (130) may be 0.5 to 2 mm in height. The gap (130) may be 0.1 mm to 2 mm in height. The gap (130) may be an air gap (130). The gap (130) may be in an inert atmosphere. The gap (130) may be a vacuum.

The conductive object (120) may make a first pass over the layer of metal powder (110) at a first voltage difference between the conductive object (120) and the layer of metal powder (110) and the conductive object (120) may subsequently make a second pass over the layer of metal powder (110) at a second voltage difference between the conductive object (120) and the layer of metal powder (110). Similarly, different passes may be made at different separations but a common voltage difference between the layer of metal powder (110) and the conductive object (120). Passes may vary other parameters such as speed, waveform of the voltage, heating, light exposure, etc. depending on the desired effect (e.g., mixing and/or compaction) and support for other processes.

The system (100) may include a guide to control a separation between a lower surface of the conductive object (120) and an upper surface of the layer of metal powder (110). The guide may be a post and/or rest which provides a standoff between the conductive object (120) and the layer of metal powder. The guide may be a wheel and/or wheels. The guide may be polymer, ceramic, and/or another non-conductive material.

The system (100) may be affixed to other translating elements of the three-dimensional printing system. For example, the system (100) may be attached to the translating mechanism used to spread powder into a uniform layer. In this case the system (100) would trail behind the powder spreading mechanism, such as a blade or roller, to mix and/or compact the powder following spreading. In another example, the system (100) may be affixed to a translating carriage that contains fluid ejection devices (e.g., inkjet heads) used to apply patterning solution to the powder layer. In this case the system (100) is configured such that mixing and/or compaction occur prior to patterning.

The voltage difference between layer of metal powder (110) and the conductive object (120) may have a periodic component. For example, the voltage difference may ramp up and down or have a sinusoidal element to promote compaction of the layer of metal powder (110). The voltage difference between the layer of metal powder (110) and the conductive object (120) may begin at a first level and then increase to a second level.

In one example, a sinusoidal voltage is applied to conductive object (120) and the powder layer is maintained at ground. In this configuration the voltage difference between the conductive object and the powder layer changes sign in a periodic fashion. The magnitude of the alternating voltage can be maintained less than required to extract particles from the powder layer, but sufficient to cause particles to experience small up and down motion normal to the powder layer. Such vibratory motion can help to locally reposition particles into a more compact arrangement. In another example the peak value of the sinusoidal voltage is sufficient to extract powder particles from the powder layer.

The conductive object (120) may include features to prevent particles from moving laterally outside of the area beneath the surface of the conductive object. As an example, a dielectric plate may be attached to the side(s) of the conductive object (120) and extend below its bottom surface towards the surface of the powder layer (110), thereby blocking egress of particles. The dielectric plate may be a film. The dielectric plate may contact the powder layer (110). The dielectric plate may not extend all the way to the powder layer.

FIGS. 2A-2D are a series of figures showing the motion and charge of a particle moving between a powder layer and a charged body in an example consistent with this specification. The charged conductive particle starts as part of the layer of metal powder (110), travels to the conductive object (120), changes charge sign, and then travels back to the layer of metal powder (110), where the particle charge once again changes sign. This cycle may then repeat.

Figure 2A:
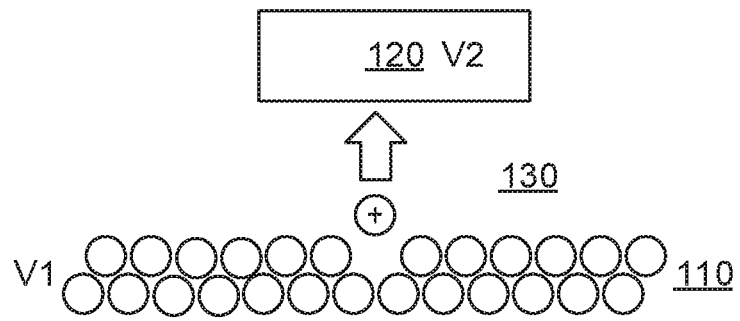
FIGS. 2A-2D show a series of figures showing the motion and charge of a particle moving between a powder layer and a charged body in an example consistent with this specification.

FIG. 2A shows a layer of metal powder (110) at a first voltage (V1). The conductive object (120) is located above the layer of metal powder (110), and is at a second voltage (V2). If V1>V2, then the sign of charge on the surface of the powder layer is (+) and the sign of charge on the surface of conductive object (120) is (−). If V1<V2, the charge signs are reversed. FIGS. 2A-D depict the situation with V1>V2. Any suitable first and second voltage capable of creating the desired motion of the conductive particles may be used. In an example, the first voltage may be ground and the second voltage may be −1500 volts with a 1 mm air gap (130) separation.

In FIG. 2A, a conductive particle from the layer of metal particles (110) moves from the layer of metal particles to the conductive object (120) through the gap (130). This motion is indicated by the arrow. The conductive particle has a charge indicated with a plus sign (+), consistent with the voltage of the powder layer being greater than that of the conductive object. The conductive particle is attracted to the negatively charged conductive object (120).

Figure 2B:
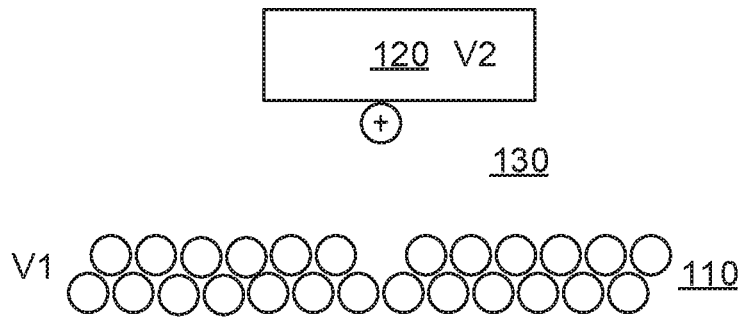
Figure 2C:
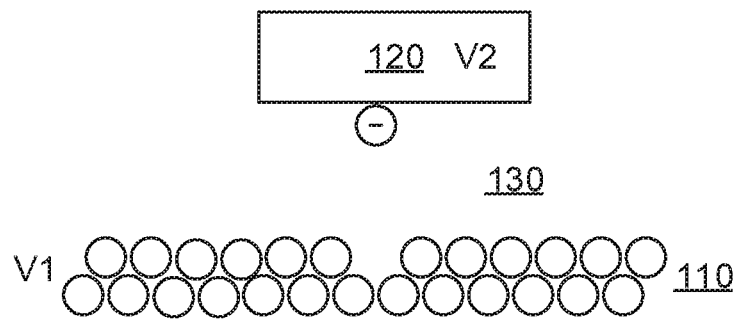
Figure 2D:
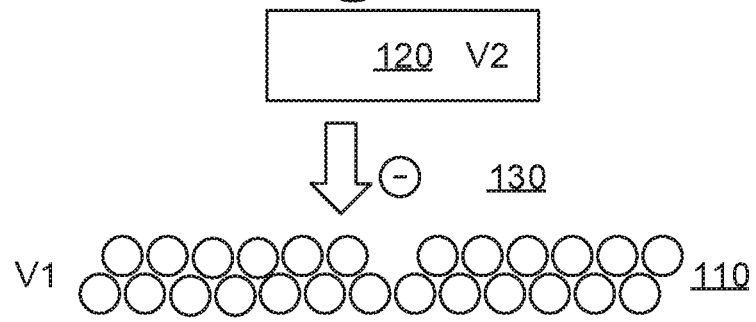

In FIG. 2B, the positively charge conductive particle makes contact with the conductive object (120). In FIG. 2C, the conductive particle loses its positive charge and acquires negative charge consistent with the lower voltage of the conductive object (120) relative to the powder layer (110). This is indicated by the change from a plus sign (+) to a minus sign (−).

As the conductive particle now has negative charge, it is attracted to the positively charged layer of metal powder (110). Under the influence of this attraction and gravity the conductive particle travels to the layer of metal powder (110) through the gap (130) as shown by the arrow. The conductive particle impacts the layer of metal powder (110) and compacts the layer of metal powder (110). The conductive particle now loses its negative charge and becomes positively charged, along with all other particles on the surface of metal powder (110). The cycle shown in FIGS. 2A-2D may then repeat.

Figure 3:
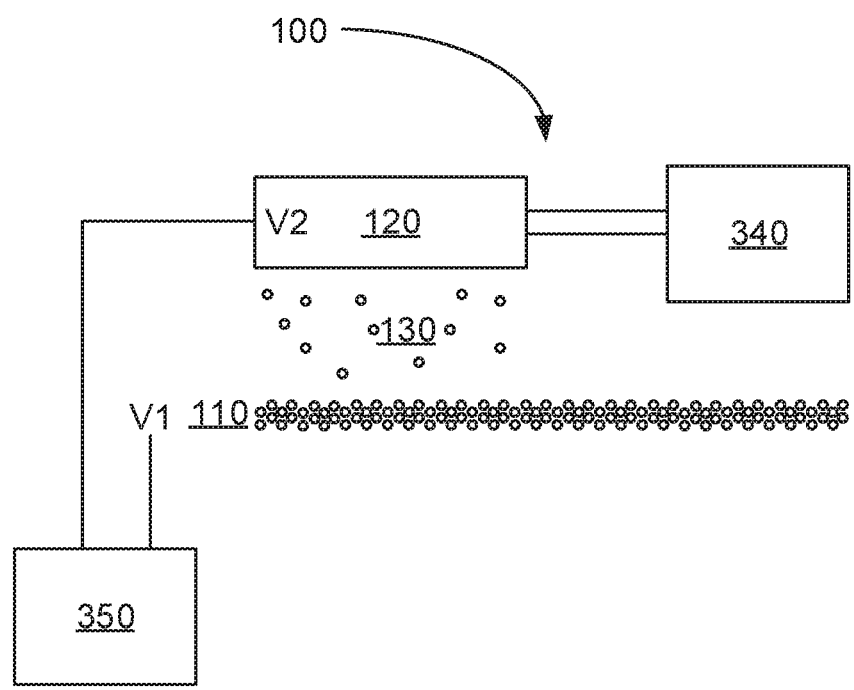
FIG. 3 shows an example of a system for compacting powder layers according to one example consistent with this specification.

FIG. 3 shows an example of a system (100) for compacting powder layers according to one example consistent with this specification. The system (100) includes: a layer of powder (110) including metal particles, the layer of powder (110) having a surface at a first voltage (V1); a conductive object (120) maintained at a second voltage (V2), the conductive object (120) and the layer of powder (110) separated by a gap (130); and an actuator (340) to provide relative lateral motion between the conductive object (120) and the layer of powder (110), and a power supply (350) to provide the first voltage to the layer of powder (110) and the second voltage to the conductive object (120), wherein a voltage difference between the layer of powder (110) and the conductive object (120) induces charged metal particles of the layer of powder (110) to move from the layer (110) to the conductive object (120), assume the voltage of the conductive object (120), and move from the conductive object (120) to the layer (110). FIG. 3 includes a power supply (350) to provide the voltage difference between V1 and V2.

The actuator (340) may be a group of actuators to provide relative motion between the conductive object (120) and the layer of metal powder (110). The actuator may provide motion in X, Y, Z, and/or other directions. In an example, the conductive object (120) extends over a width of the layer of metal powder (110) and the actuator (340) provides relative motion in the length axis of the layer of metal powder (110). The actuator (340) may provide vertical motion to provide different electric field strengths between the conductive object (120) and the layer of metal powder (110). The actuator (340) may move the layer of metal powder (110), for example, by moving a build area and/or bed. The actuator (340) may move the conductive object (120). In an example, the conductive object (120) is mounted as part of a carriage with other tools for modifying the layer of metal powder, such as a powder spreader, a fluid ejector, a radiation source (e.g., ultraviolet), etc. The actuator (340) may be capable of moving the conductive object (120) independently of the other tools.

The power supply (350) may provide the voltage difference between the first voltage and the second voltage. The power supply (350) may provide power to other portions of the system (100). The power supply (350) may provide other voltages to other elements of the system (100). The power supply (350) may receive power as a standard AC and/or industrial AC line and convert the power to high voltage. In one example, the power supply uses a transformer to setup the voltage.

Figure 4:
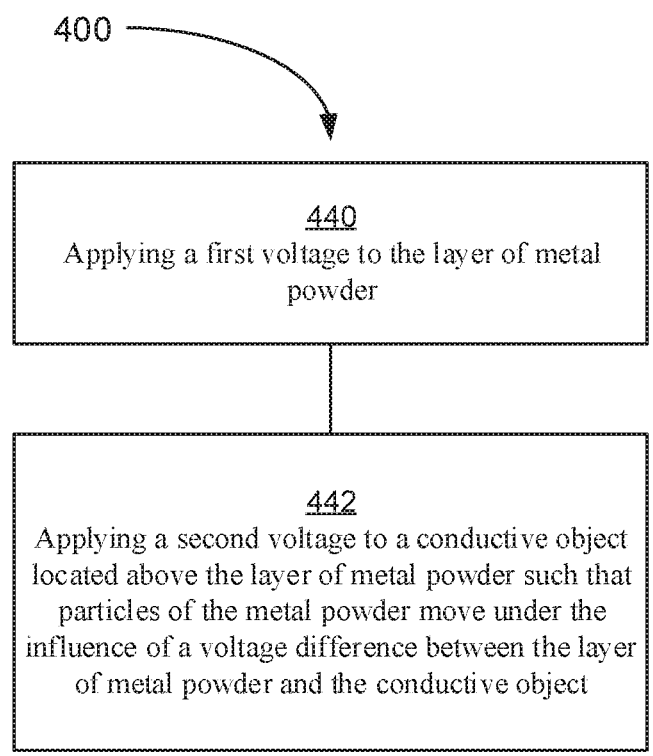
FIG. 4 contains a flowchart for a method of compacting metal powders consistent with this specification.

FIG. 4 contains a flowchart for a method (400) to increase density of a layer of metal powder consistent with this specification. The method (400) includes: applying a first voltage to the layer of metal powder (110) (440); and applying a second voltage to a conductive object (120) located above the layer of metal powder (110) such that particles of the metal powder move under the influence of a voltage difference between the layer of metal powder (110) and the conductive object (120) (442).

The method (400) is a method (400) to increase the density of a layer of metal powder (110). The method (400) moves metal particles of the layer of metal powder (110). The motion may be used to reduce the free space between particles by allowing the metal particles to shift to lower energy positions. In this manner, the provided motion is similar to mechanical vibration. The motion may also be used to compact the layer by impacting the particles on the surface of the layer of metal powder (110). Impact compression is more like mechanical compaction of the layer but uses the particles of the layer of metal powder (110) rather than a roller or pressor. The described methods of increasing density of the layer of metal powder (110) may be supplemented with mechanical compaction and/or mechanical vibration.

The method (400) includes applying a first voltage to the layer of metal powder (110) (440). The first voltage may be positive, negative, or ground. The layer of metal powder (110) should be sufficiently conductive to allow the first voltage to reach the surface of the layer of metal powder (110). This allows inclusion of some non-conductive particles as part of the layer of metal particles. Such non-conductive particles may be ceramics, polymers, binders, carbon, certain metal oxides, etc.

The method (400) includes applying a second voltage to a conductive object (120) located above the layer of metal powder (110) such that particles of the metal powder move under the influence of a voltage difference between the layer of metal powder (110) and the conductive object (120) (442). The second voltage may be positive, negative, or ground. The difference between the first and second voltage should be large enough to produce the desired motion. In an example, the first voltage is positive and the second voltage is negative. In another example the first voltage is negative and the second voltage is positive. In a third example, the first voltage is ground and the second voltage is positive. In a fourth example, the first voltage is ground, and the second voltage is negative. In a sixth example, the first voltage and the second voltage are both positive. In a seventh example, the first voltage and the second voltage are both negative.

For an air gap (130) of approximately 1 mm between a 0.2 mm layer of metal powder (110) and a conductive object (120) using copper powder (Goodfellow, 50 µm), a voltage difference of 800 volts was sufficient to induce some charge transfer. The charge transfer increased with increasing voltage to approximately 1500 volts before the rate of increase in charge transfer with increasing voltage slowed. While not wishing to be bound by any particular theory, it appears that smaller particles are first recruited to move between the layer of metal particles (110) and the conductive object (120). Once all the powder has been placed in motion, increasing the voltage difference increases the charge on the particles, as well as the speed of the particles transferring charge. The continued slow rise in current transfer may be the result of increasing charge and speed of the particles. In this specific experiment, one electrode was grounded and a negative pulse of approximately 1 second was applied to the second electrode. For the voltages above 1500 V, the steady state current from particle motion was reached within about 10 mS.

The specific voltages required to induce motion will depend on the separation between the conductive object (120) and layer of metal powder (110), the size of the particles in the layer of metal powder (110), and/or the viscosity of the medium in the gap (130), such as, air, argon, nitrogen, mineral oil, or vacuum. The medium in the gap (130) should be non-conductive to avoid shorting the potential difference between the conductive object (120) and the layer of metal powder (110).

Figure 5:
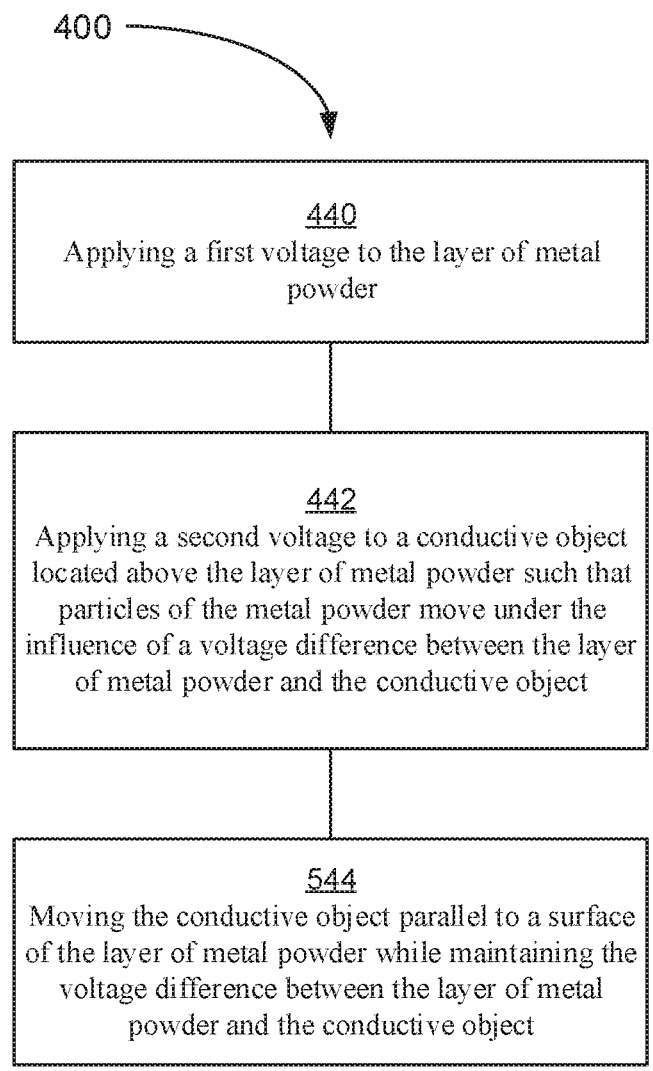
FIG. 5 contains a flowchart for a method of compacting metal powders consistent with this specification.

FIG. 5 contains a flowchart for a method (400) to increase density of a layer of metal powder consistent with this specification. The method (400) includes: applying a first voltage to the layer of metal powder (110) (440); applying a second voltage to an conductive object (120) located above the layer of metal powder such that particles of the metal powder move under the influence of a voltage difference between the layer of metal powder (110) and the conductive object (120) (442); and moving the conductive object (120) parallel to a surface of the layer of metal powder (110) while maintaining the voltage difference between the layer of metal powder (110) and the conductive object (120) (544).

The method (400) may include moving the conductive object (120) parallel to a surface of the layer of metal powder (110) (544). The conductive object (120) may be moved in a single axis. The conductive object (120) maybe moved in multiple axes, such as, X and Y, so as to raster above the surface. In an example, it may be desirable to compact the entire layer of metal powder (110). It may be useful to compact portions of the layer of metal powder (110) that will be used to form a part and to not compact portions which will not be used to form a part.

It will be appreciated that, within the principles described by this specification, a vast number of variations exist. It should also be appreciated that the examples described are only examples, and are not intended to limit the scope, applicability, or construction of the claims in any way.

What is claimed is:

1. A system for compacting layers of metal powder, comprising:
    a layer of metal powder at a first voltage; and
    a conductive object above the layer of metal powder, the conductive object at a second voltage, wherein the conductive object and layer of metal powder are separated by a gap and a voltage differential between the layer of metal powder and the conductive object is sufficient to reposition particles to new locations within the layer of metal powder layer.

2. The system of claim 1 wherein the layer of metal powder and the conductive object are separated by 0.2 to 5 mm of gap.

3. The system of claim 1,
    wherein the conductive object and the layer of metal powder are separated by the air gap.

4. The system of claim 1, wherein the conductive object has a width greater than a width of the layer of metal powder.

5. The system of claim 1, wherein the conductive object has a flat lower surface.

6. The system of claim 1, wherein the conductive object comprises a dielectric plate extending below a lower surface of the conductive object.

7. The system of claim 1, further comprising an actuator to move the conductive object laterally above the layer of metal powder.

8. The system of claim 7, wherein the conductive object makes a first pass over the layer of metal powder having a first voltage difference between the conductive object and the layer of metal powder and the conductive object makes a second pass over the charged layer having a second voltage difference between the conductive object and the layer of metal powder.

9. The system of claim 7, further comprising a guide to control a separation between a lower surface of the conductive object and an upper surface of the layer of metal powder.

10. The system of claim 1, wherein the voltage difference between the conductive object and the powder layer has a periodic component.

11. The system of claim 1, wherein the voltage difference between the layer of metal powder and the conductive object is 200 to 5000 volts.

12. The system of claim 1, further comprising:
    an actuator to provide relative lateral motion between the conductive object and the layer of metal powder; and
    a power supply to provide the first voltage to the layer of powder and the second voltage to the conductive object,
    wherein a voltage difference between the layer of powder and the conductive object induces charged metal particles of the powder layer to move from the layer to the conductive object, assume the voltage of the conductive object, and move from the conductive object to the layer.

13. The system of claim 12, wherein a surface of the conductive object closest to the layer of metal powder is flat.

14. A method of operating the system of claim 1 to increase density of the layer of metal powder, the method comprising:
    applying the first voltage to the layer of metal powder; and
    applying the second voltage to the conductive object located above the layer of metal powder such that particles of the metal powder move under the influence of a voltage difference between the layer of metal powder and the conductive object.

15. The method of claim 14, further comprising moving the conductive object parallel to a surface of the layer of metal powder while maintaining the voltage difference between the layer of metal powder and the conductive object.

16. The system of claim 1, wherein the gap and voltage differential are structured to:
    cause metal particles of the metal powder layer to travel to the conductive object where a charge on the metal particles changes; and
    travel back to the layer of metal powder where the charge on the metal particles again changes.

* * * * *